US006226534B1

(12) United States Patent
Aizawa

(10) Patent No.: US 6,226,534 B1
(45) Date of Patent: May 1, 2001

(54) PORTABLE INFORMATION TERMINAL APPARATUS, NUMERIC DISPLAYING METHOD, STORAGE MEDIUM, AND INFORMATION PROCESSING APPARATUS

(75) Inventor: Masatoshi Aizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/212,802

(22) Filed: Dec. 16, 1998

(30) Foreign Application Priority Data

Dec. 18, 1997 (JP) .................................................. 9-349100

(51) Int. Cl.[7] ...................................................... H04B 1/38

(52) U.S. Cl. ........................ 455/566; 455/31.1; 455/31.2; 455/564; 455/550; 379/355

(58) Field of Search .................................... 455/566, 550, 455/344, 45, 31.2, 31.1, 564; 345/184, 156

(56) References Cited

U.S. PATENT DOCUMENTS 4,302,829 * 11/1981 Morokawa et al. .................. 368/82
5,436,954 * 7/1995 Nishiyama et al. ................ 455/566
5,659,890 * 8/1997 Hidaka ................................ 455/575
5,703,774 * 12/1997 Houck et al. .................. 364/424.06
5,742,565 * 4/1998 Cuinet et al. ........................ 368/190
5,956,632 * 9/1999 Shon .................................... 455/404
5,987,336 * 11/1999 Sudo et al. .......................... 455/566

* cited by examiner

*Primary Examiner*—Nay Maung
*Assistant Examiner*—L West
(74) *Attorney, Agent, or Firm*—Jay H. Maioli

(57) ABSTRACT

An information terminal include a communicating device for communication by radio, a controller for at least processing data, and a display screen. When the communicating device receives a signal of radio waves from a transmitting base, the controller extracts information from the received signal and displays the extracted information on the display screen. Also included is an input device having a rotatable operation part that may be rotated clockwise and counterclockwise in desired amounts and at desired angles to effect inputs. The controller displays predetermined numerics on the display screen, processes the inputs from the input device, and changes the predetermined numerics displayed on the display screen in accordance with the processed inputs.

12 Claims, 12 Drawing Sheets

PORTABLE INFORMATION TERMINAL APPARATUS, NUMERIC DISPLAYING METHOD, STORAGE MEDIUM, AND INFORMATION PROCESSING APPARATUS

BACKGROUND OF THE INVENTION

The present invention relates to a portable information terminal apparatus for signal communication by radio, the apparatus being implemented illustratively as a pager which receives a radio signal from a radio station, ascertains that the signal is addressed thereto, alerts the user to the incoming signal by means of sound, light and/or mechanical vibration, and displays the received information.

There exist portable information terminal apparatuses each serving as a terminal of a communication network. They have been commercialized with diverse structures and functions to meet today's varied and rapidly expanding demands in the field of telecommunications.

One typical portable information terminal apparatus is the pager for receiving radio signals. In its infancy, the pager was a terminal that beeped upon receipt of a call signal from a radio station. Typically, a user carrying such a pager would be in a location away from wired telephones. On receiving a radio call signal issued by someone via a radio station, the pager alerted the user to call back from the nearest wired telephone.

Then came the new generation of pagers capable of receiving not only simple call signals but also signals containing information via radio stations. The type of pager used extensively today is the one which has a liquid crystal display panel capable of displaying a message retrieved from the incoming signal carrying information.

More functions have been added to today's pagers. One such function implemented extensively is what is known as a vibrator function that replaces beeping sound when necessary. This function is used advantageously outdoors and locations where sound-based alert is not helpful. Such locations include bustling streets where ambient noise may hamper the user from hearing an alerting sound, and theaters and conference rooms where silence is the norm in the audience and a beep will disrupt the atmosphere. The user may select manually either beeping sound or the vibrator function as alerting means.

To offer more convenience for the user, the pager may have a watch mode allowing its liquid crystal display (LCD) panel to indicate a date and a time of day in numerics. A growing number of portable information terminal apparatuses other than the pager are also incorporating the watch mode, with an LCD panel showing likewise the date and the time of day in numerics.

Portable information terminal apparatuses offering the watch mode also provide a watch setting mode. For example, this is a mode in which a user sets up a date and a time of day before operating the apparatus for the day or for the first time. The watch setting mode is used not only to initialize the time indication but also to correct an error of time after an extended period of use and to change displayed numerics for specific purposes.

With a portable information terminal apparatus set in the watch setting mode for changing displayed numerics, it is necessary to designate one of two displays to be changed: the date, or the time of day. When the target display is selected, it is then necessary to perform operations to increment or decrement the currently displayed numerics to get the desired ones.

Such operations are typically carried out on conventional portable information terminal apparatuses as follows: an upward and a downward arrow key are provided in the vertical direction along an edge of a liquid crystal display (LCD) panel, and a leftward and a rightward arrow key are furnished horizontally along another edge of the LCD panel. The leftward and rightward arrow keys are operated to select a target numeric among those displayed on the LCD panel. With the target numeric selected, the upward or downward arrow key is operated respectively to increment or decrement the numeric indication until a desired number is reached.

In addition, the above-mentioned portable information terminal apparatuses need to be small in overall size for carryable use by users. Hence there need to minimize the number of keys located on the apparatus panel.

Conventional portable information terminal apparatuses of the above type, however, have many operation keys that prove to be constraints on the effort to reduce their total size. The large number of parts making up the terminal can lead to higher cost and detract from the ease of operation.

An alternative to the provision of a plurality of discrete keys has presented itself in the form of a rotary input device and a rotating/pushbutton type input device. They are typically implemented as a jog dial or a rotary encoder. A single rotary input device has a rotating disk-like dial that is turned clockwise or counterclockwise in desired amounts and at desired angles in order to generate two kinds of input signal. The adoption of the dial-equipped rotary input device has reduced key-occupied space and contributed to making the terminal smaller as a whole.

However, the above rotary input device, designed to generate two kinds of input signal when rotated clockwise and counterclockwise, is not always efficient in operation.

Take for example the changing of a date indication on the display screen. When the related art arrow keys are used to update the displayed numerics, the increment and decrement of the indication obviously related to the upward and downward arrow keys respectively. That is not the case with the dial-equipped rotary input device; the increment and decrement of the numerics displayed do not obviously relate to the directions of the rotary operation part which is set in the rotary input device. That is, it is not quite sure for users which way to turn the dial for increment or decrement.

Meanwhile, rotating type sound volume adjusting devices known as rheostats are used extensively for acoustic equipments. These devices are similar in operation to the above-described dial-equipped rotary input device.

The rheostat is a dial-like device characterized by the traditionally established association between the direction of rotation and the increase or decrease of sound volume. Specifically, turning the dial clockwise increases the sound level; turning it counterclockwise turns down the sound. Where rotary input devices are used to increment or decrement a physical quantity, they may disregard the tradition at the risk of losing operative consistency with similarly manipulated rheostats.

If there is a large difference in numerics between the currently displayed date and a desired date on the terminal, updating operations must be carried out a large number of times. The procedure is a time-consuming chore that does not help to promote the ease of use.

SUMMARY OF THE INVENTION

It is therefore an object of the present invention to overcome the above and other deficiencies and disadvantages of the prior arts and to provide a portable information terminal apparatus and a numeric displaying method, the apparatus and the method allowing numerics displayed on a liquid crystal display panel to be changed or updated by simpler operations performed in fewer steps than before.

Other objects, features and advantages of the present invention will become apparent in the following specification and accompanying drawings.

DESCRIPTION OF THE PREFERRED EMBODIMENTS

Preferred embodiments of this invention will now be described below in detail with reference to the accompanying drawings. It is to be understood that although the description below contains many technically advantageous specificities, these should not be construed, unless otherwise noted, as limiting the scope of the invention but as merely providing illustrations of the presently preferred embodiments of this invention.

Figure 1:
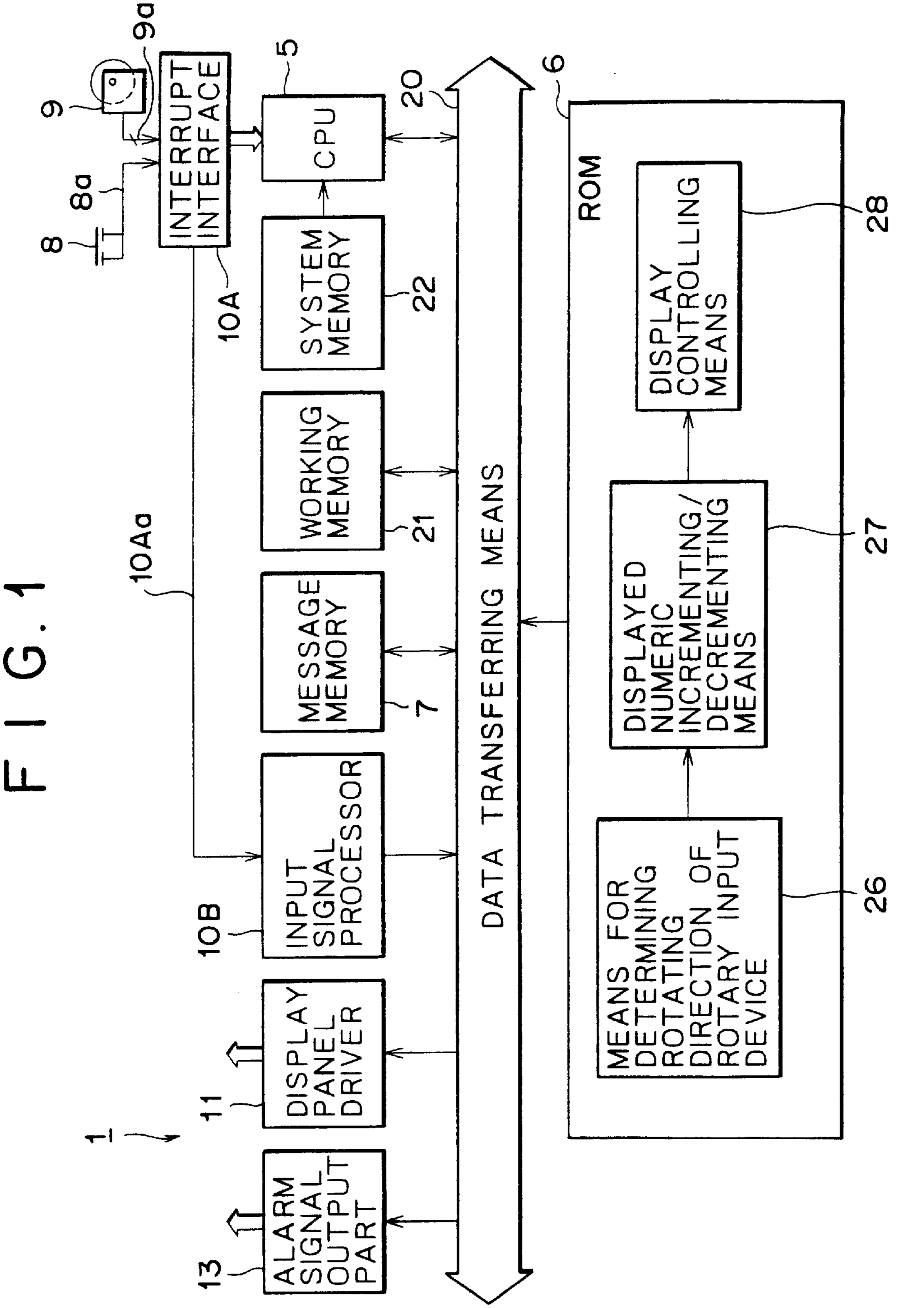
FIG. 1 is a block diagram showing a partial constitution of a pager, i.e., a portable information terminal apparatus practiced as a first embodiment of this invention.
Figure 2:
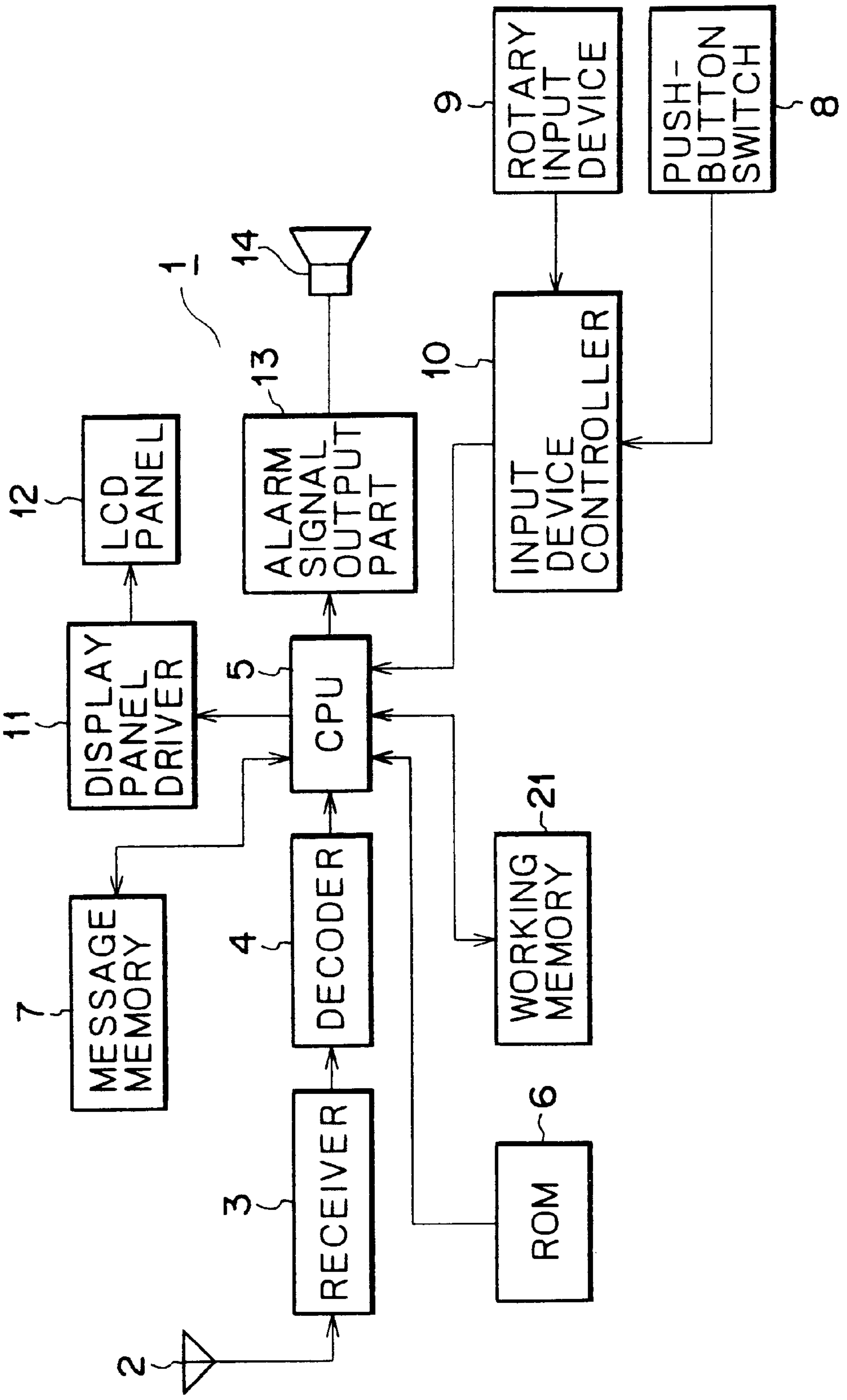
FIG. 2 is a block diagram depicting an overall constitution of the first embodiment in FIG. 1.
Figure 3:
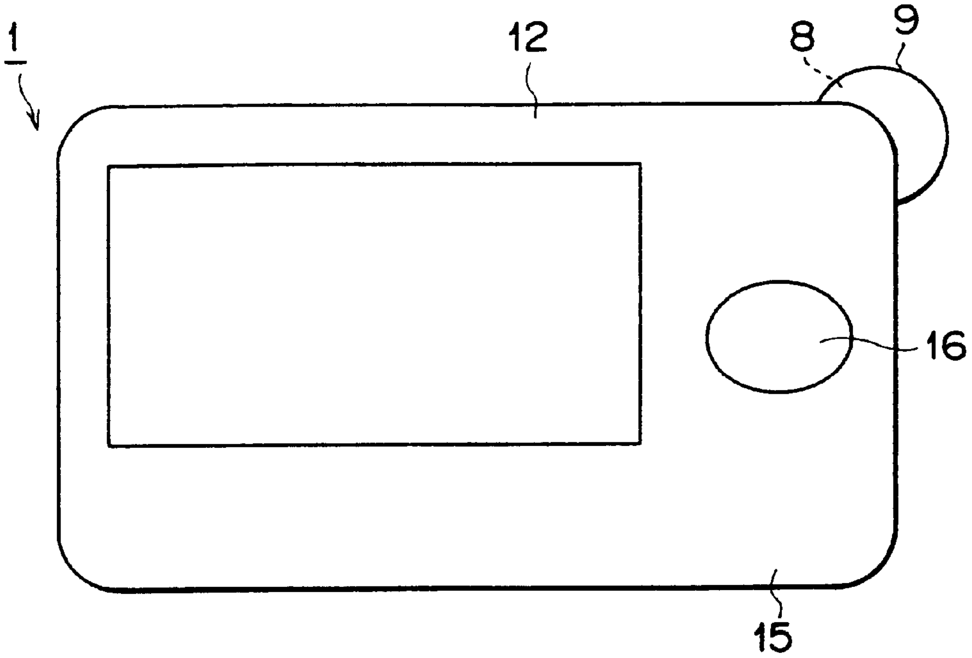
FIG. 3 is a front view of the portable information terminal apparatus as the first embodiment in FIGS. 1 and 2.
Figure 4:
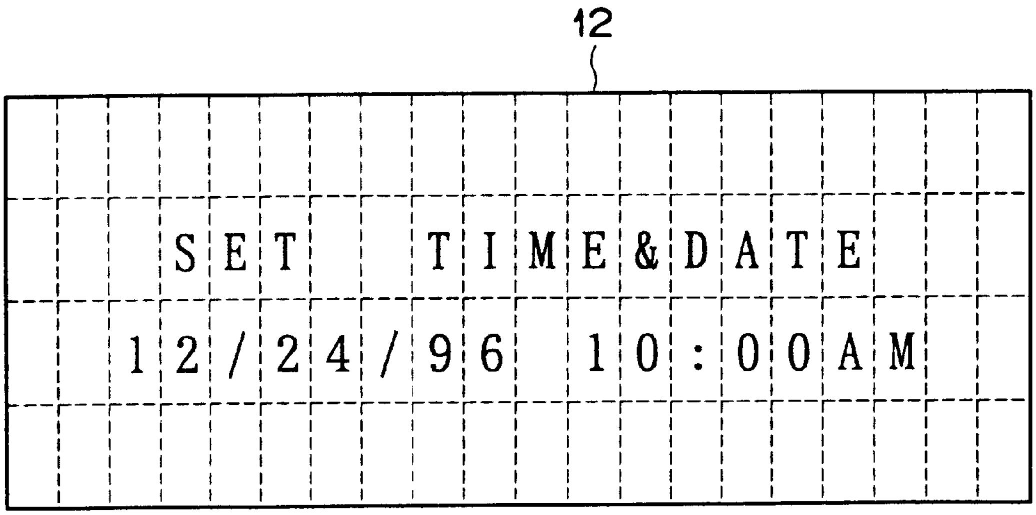
FIG. 4 is an explanatory view of a typical time and date display on the first embodiment in a watch mode.

FIG. 1 is a block diagram showing a partial constitution of a portable information terminal apparatus implemented as the first embodiment of this invention. FIG. 2 is a block diagram depicting an overall constitution of the apparatus in FIG. 1. FIG. 3 is a front view of the apparatus shown in FIGS. 1 and 2. FIG. 4 is an explanatory view of a typical time and date display on the apparatus of FIGS. 1, 2 and 3 in a watch setting mode.

The portable information terminal apparatus practiced as the first embodiment of the invention constitutes specifically a pager. As shown in FIG. 2, the pager comprises an antenna 2, a receiver 3 and a decoder 4 making up communicating means of the apparatus. The antenna 2 receives radio waves from a transmitting base such as a radio station located in remote areas. The receiver 3 is connected to the antenna 2, and detects and amplifies a signal received by the antenna 2. The decoder 4 is connected to the receiver 3, and decodes coded information out of the received signal.

The decoder 4 has an A/D converter that generates digital information. Another function of the decoder 4 matches an ID code held in an ID memory (not shown) such as an EEPROM against the decoded information to verify whether the transmitted information is destined for the own apparatus. An output side of the decoder 4 is connected to a CPU 5.

The CPU 5 is connected to a message memory 7 illustratively made of an SRAM. Message information within the decoded information from the decoder 4 that has been processed with respect to the received signal is written to the message memory 7 for storage therein. The stored message information is read from the memory and displayed onto a display screen. Instead of the SRAM, a nonvolatile memory such as an EEPROM may also constitute the message memory 7.

The CPU 5 made of a microcomputer connected to the decoder 4 and message memory 7 controls data processing and input/output operations. Based on various executable procedures (programs) held in a ROM 6, the CPU 5 controls and manages operations of the apparatus as whole. These operations include admitting and processing signals from input devices (to be described later), writing data to the message memory 7, organizing files, creating and updating a table of contents (TOC), retrieving files from memory, controlling the display of message information and other indications on the display screen, and controlling the alerting of a user to received signals and abnormal voltages. Temporary data (e.g., look-up table or LUT) generated by the CPU 5 in operation is placed for the moment in a working memory 21 constituted illustratively by a DRAM. The ROM 6 may be a read-only MOS memory, a flash memory, or the like.

Further, a rotary input device 9 and a pushbutton switch 8 are formed integrally and are provided as input devices to be operated by a user. The rotary input device 9 and pushbutton switch 8 are connected to an input device controller 10 which in turn is connected to the CPU 5. Signals from the input devices are inputted to the CPU 5 by way of the input device controller 10.

The CPU 5 is also connected to a display panel driver 11. A liquid crystal display (LCD) panel 12 is connected as a display screen to the display panel driver 11. A display signal outputted by the CPU 5 is sent to the display panel driver 11. In turn, the display panel driver 11 inputs a drive signal to the LCD panel 12 to drive the latter and generate a display on a screen. The display signal is written as a display image into a VRAM (video RAM, not shown) so that the drive signal is prepared on the basis of that display image. The VRAM may be furnished either as a dedicated memory or as a VRAM area occupying part of the working memory 21.

The CPU 5 is further connected to an alarm signal output part 13 which in turn is connected to a speaker 14 acting as an alerting device. An alarm signal outputted by the CPU 5 is inputted to the alarm signal output part 13 whereby the signal is converted to an audio signal driving the speaker 14. Alternatively, the speaker 14 may be replaced by a buzzer.

The CPU 5, ROM 6, working memory 21, and input device controller 10 outlined above constitute controlling means of the inventive apparatus. Key components of the apparatus are described below in detail with reference to FIG. 1.

Data transferring means 20 is a data bus to which are connected the CPU 5, the ROM 6, the working memory 21, the message memory 7, an input signal processor 10B, the display panel driver 11, and the alarm signal output part 13. The CPU 5 exchanges data via the data transferring means 20 with the ROM 6, working memory 21, message memory 7, display panel driver 11, alarm signal output part 13, and input signal processor 10B.

A system memory 22 is connected to the CPU 5. The system memory 22 contains procedures for controlling the inventive apparatus as a whole, in the form of executable programs for CPU 5.

The CPU 5 has an interrupt receiving terminal. An input signal 9*a* or 8*a* coming respectively from the rotary input device 9 or the pushbutton switch 8 passes through an interrupt interface 10A to become an interrupt signal. The interrupt signal is admitted to the CPU 5 through its interrupt receiving terminal.

In the above setup, when operating either the rotary input device 9 or the pushbutton switch 8 generates the input signal 9*a* or 8*a*, this causes the interrupt interface 10A to input an interrupt signal to the CPU 5. The CPU now enters an interrupt handling phase.

Figure 6:
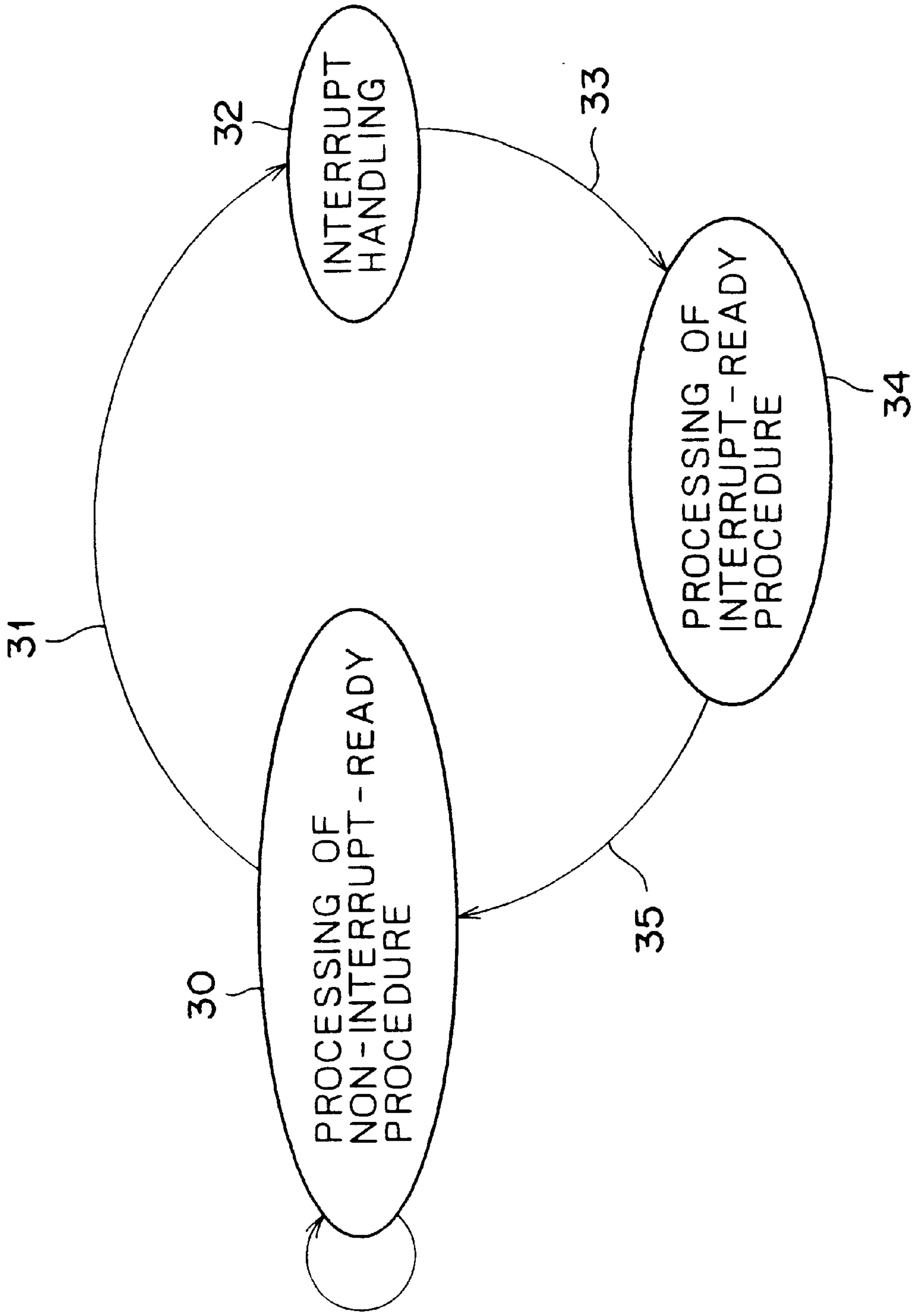
FIG. 6 is a transition diagram showing typical transitions between different stages of handling interruptions generated by an input device.

FIG. 6 is a transition diagram showing typical transitions between different stages of handling interruptions generated by an input device. Initially, the CPU 5 is in a state of non-interrupt-ready procedure processing 30. When detecting an interrupt 31 upon receipt of an interrupt signal, the CPU 5 executes an interrupt signal handling procedure held in the system memory 22 to handle the interrupt signal. The input device that has generated the interrupt is identified here in one of two ways: directly by way of the interrupt receiving terminal, or by the interrupt interface 10A forwarding an input signal 10A*a* to the input signal processor 10B.

Once the input device having issued the interrupt is identified (i.e., the device operated by the user), an interrupt-ready procedure corresponding to the input device in question is retrieved from the system memory 22 (transition 33 in FIG. 6). This brings about a state of interrupt-ready procedure processing 34. When input values or other data from the input device have been finalized (at the transition 35), interrupt handling is completed. The CPU 5 returns to the state of non-interrupt-ready procedure processing 30. From now on, the input values from the input device become usable.

Figure 5:
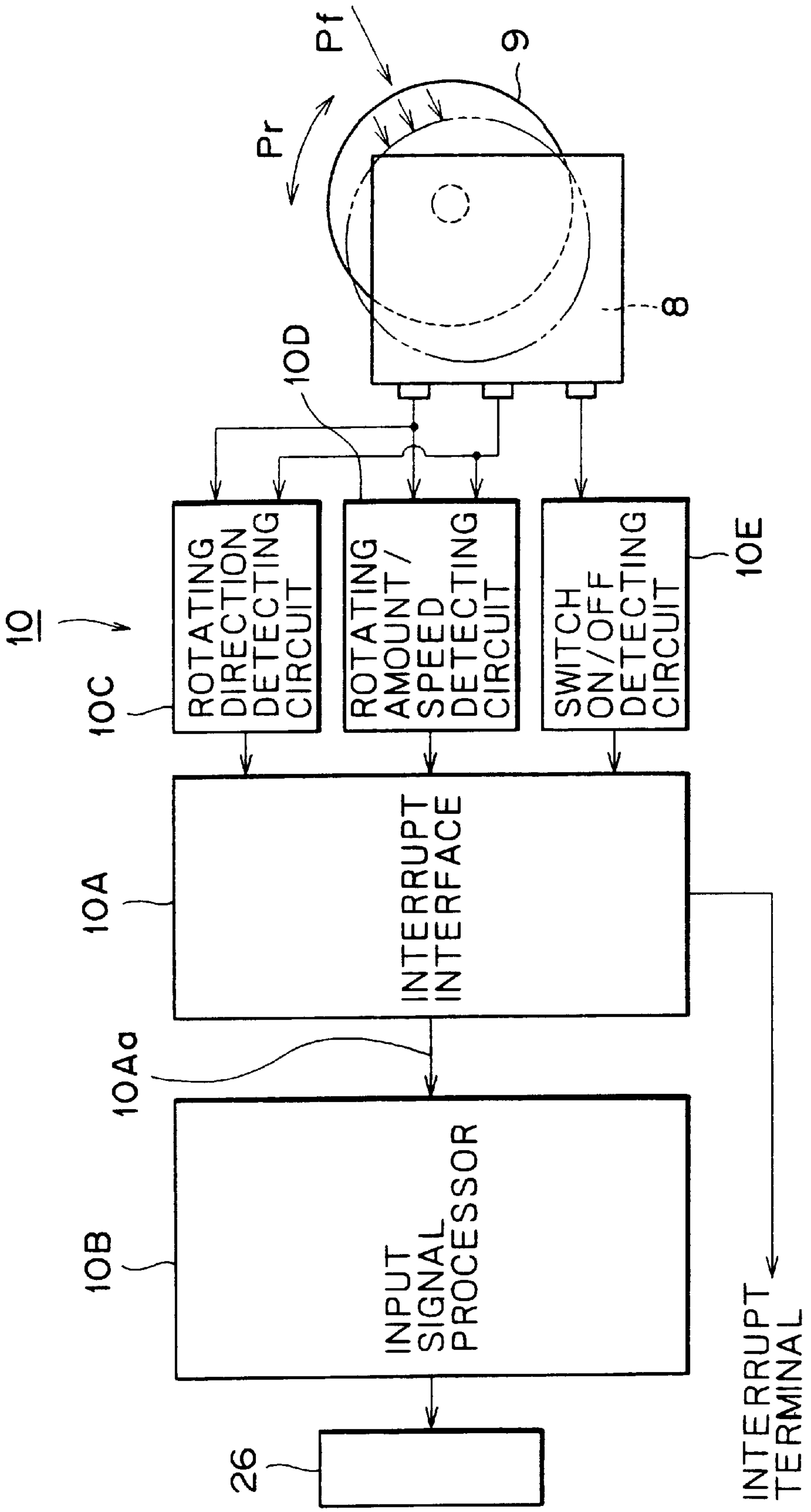
FIG. 5 is a block diagram of a rotary input device for use with the first embodiment.

How the rotary input device 9 and pushbutton switch 8 work will now be described. FIG. 5 is a block diagram of a typical rotating type input device. This is an example in which the rotary input device 9 and the pushbutton switch 8 are formed integrally.

The rotary input device 9 has a dial, i.e., a rotatable operation part that may be rotated freely in the direction of an arrow Pr. Turning the operation part (dial) clockwise or counterclockwise in desired amounts and at desired angles, causes the device to generate an input that appears on its terminals as a state reflecting the rotating direction.

Pushing the dial in the direction of an arrow Pf activates or deactivates the pushbutton switch 8. An ON or OFF state appears accordingly at the terminals of the device.

Information about the rotating direction of the dial on the rotary input device 9 is inputted to the interrupt interface 10A as a signal obtained by a rotating direction detecting circuit 10C (part of the input device controller 10) from the terminals of the device. Given the input information, the interrupt interface 10A generates an interrupt signal correspondingly. At the same time, the interrupt interface 10A creates a signal 10A*a* bearing the information about the rotating direction of the dial, and inputs the signal 10A*a* to the input signal processor 10B.

On receiving the signal 10A*a*, the input signal processor 10B forwards the signal either immediately or after holding it for output onto the data transferring means 20. The information is accepted when means 26 for determining the rotating direction of the rotary input device, which is held in the ROM 6, is to be executed.

If the input signal processor 10B outputs the signal 10A*a* immediately without holding it, that means the information about the rotating direction of the dial is utilized only once. More specifically, one dial operation corresponds to one process. If the input signal processor 10B outputs the signal 10A*a* after holding it, that means the information about the rotating direction of the dial may be used repeatedly. That is, while the dial is being rotated continuously, the process is repeated during that period.

Alternatively, as illustrated in FIG. 5, a rotating amount/speed detecting circuit 10D (another part of the input device controller 10) may send to the interrupt interface 10A a signal acquired from the terminals of the device and representing information about the rotating amount and speed of the dial set in the rotary input device 9. The signal may be accepted in a subsequent process.

Information denoting an ON or OFF state of the pushbutton switch 8 is acquired as another signal from the terminals of the device by a switch on/off detecting circuit 10E. The signal is input likewise to the interrupt interface 10A. The rotary input device 9 and pushbutton switch 8 are structured so that each of them may be operated separately. The two components may also be operated at the same time to effect simultaneous inputs.

The rotary input device 9 may specifically be a jog dial. As such, the device 9 serves to input instruction signals covering all operation control signals including instruction signals for changing displayed numerics on the screen. The pushbutton switch 8 acts as a signal input device used to finalize displayed numerics as well as to shift the apparatus from one operation mode to another.

Referring again to FIG. 1, a plurality of means stored in the ROM 6 will now be described. As shown in FIG. 1, the ROM 6 includes the means 26 for determining the rotating direction of the rotary input device, displayed numeric incrementing/decrementing means 27, and display controlling means 28. They are all stored as procedures (i.e., programs) that are executable by the CPU 5. The programs may be executed either directly or indirectly. Preferably, the programs may be addressed in an absolute binary format. Alternatively, the programs may be written in a relocatable binary format that requires readdressing upon execution. In the latter case, it is necessary to make linkage means reside illustratively in the system memory 22.

Described below with reference to FIG. 3 is a typical constitution of the portable information terminal apparatus practiced as the first embodiment of this invention. FIG. 3 is a front view of the apparatus.

As depicted in FIG. 3, the inventive portable information terminal apparatus is housed in a thin, rectangular cabinet 15. In the approximate middle of the front of the cabinet 15 is the liquid crystal display (LCD) panel 12 that gives the message, date and time-of-day indications. A jog dial embodying the rotary input device 9 is attached to the top right corner of the cabinet 15, the jog dial being partially projected from the cabinet 15. The rotary input device 9 allows its dial to be rotated clockwise or counterclockwise in desired amounts and at desired angles.

Adjacent to the LCD panel 12 is an escape key 16 that may be pushed to activate. A user operates the escape key 16 to perform such operations as inputting a signal to stop an alarm sounded in response to an incoming signal, and inputting signals to control operations including those for effecting transition between watch setting mode and watch display mode.

The escape key 16 is furnished in a slightly recessed location inwardly from the flush level with the surface of the cabinet 15. In its location, the escape key 16 is protected against inadvertently applied actions from the outside. In other words, the structure is designed to forestall unintended operations.

The LCD panel 12 gives an alphabetic or alphanumeric indication in four lines of 20 characters each.

The portable information terminal apparatus 1 has two modes: an information display mode and a watch setting mode. In the information display mode, the LCD panel 12 displays a message extracted from the received signal as well as a date and a time-of-day indication. With this mode in effect, the user may operate the rotary input device 9 so as to scroll the screen.

In the watch setting mode, the LCD panel 12 displays a date and a time of day as shown in FIG. 4. In this mode, the user may operate the rotary input device 9 to correct, change or update the date and/or the time of day on display as needed.

On the LCD panel 12, when the display of FIG. 4 in the watch setting mode is given to change the numerics in date and time-of-day indication fields requires first selecting a desired field on the display screen. In each selected field, the numeric inside is incremented or decremented by operating the rotary input device 9. According to the present invention, the numeric is incremented by turning the dial of the device 9 clockwise in desired amounts and at desired angles and decremented by turning the dial counterclockwise in desired amounts and at desired angles. When a target value is reached after the increment and/or decrement, the pushbutton switch 8 is pushed to finally determine the value.

The constitution of the portable information terminal apparatus practiced as the first embodiment of this invention has been described above. What follows is a description of the workings of the first embodiment. Described below with reference to FIG. 2 is how the apparatus works in receiving an ordinary radio signal and displaying a message in the information display mode.

A radio station transmits a radio signal carrying information (message) destined for a specific portable information terminal apparatus 1. The apparatus receives the signal by means of its antenna 2. The receiver 3 submits the signal to such processes as intermediate frequency transformation, amplification and detection. The decoder 4 checks to see if the signal is destined for the own apparatus before decoding the received information signal. When decoded, the information signal is stored into the message memory 7 under control of the CPU 5.

The CPU 5 controls the portable information apparatus 1 in operation in accordance with control programs held in the ROM 6. First, the CPU 5 checks to see if any information signal has been received. If the receipt of an information signal is ascertained, the CPU 5 activates the display panel driver 11. In turn, the display panel driver 11 causes the LCD panel 12 to display the received information in four lines of 20 alphabets or alphanumeric characters each.

At the same time, the CPU 5 activates the alarm signal output part 13. In response, the alarm signal output part 13 inputs an alarm signal to the speaker 14. The speaker 14 sounds, alerting the user to the receipt of the information signal.

In the above state, the user reads a message displayed on the LCD panel 12. If the message in its entirety exceeds one screen having four lines of 20 characters each, the user may scroll the display screen to read all of the message.

Next, the work in the watch setting mode will now be described. In this mode, the LCD panel 12 displays the current date and time of day as shown in FIG. 4. The display item fields include a year field, a month field, a day field, an hour field, a minute field, and an AM/PM field. A desired field in which the numeric is to be changed is selected by operating the pushbutton switch 8.

Illustratively, the minute indication is changed as follows: the minute field is first selected by operating the pushbutton switch 8. Then the dial of the rotary input device 9 is turned clockwise or counterclockwise in desired amounts and at the desired angle in order to increment or decrement the numeric in the minute field.

Figure 7:
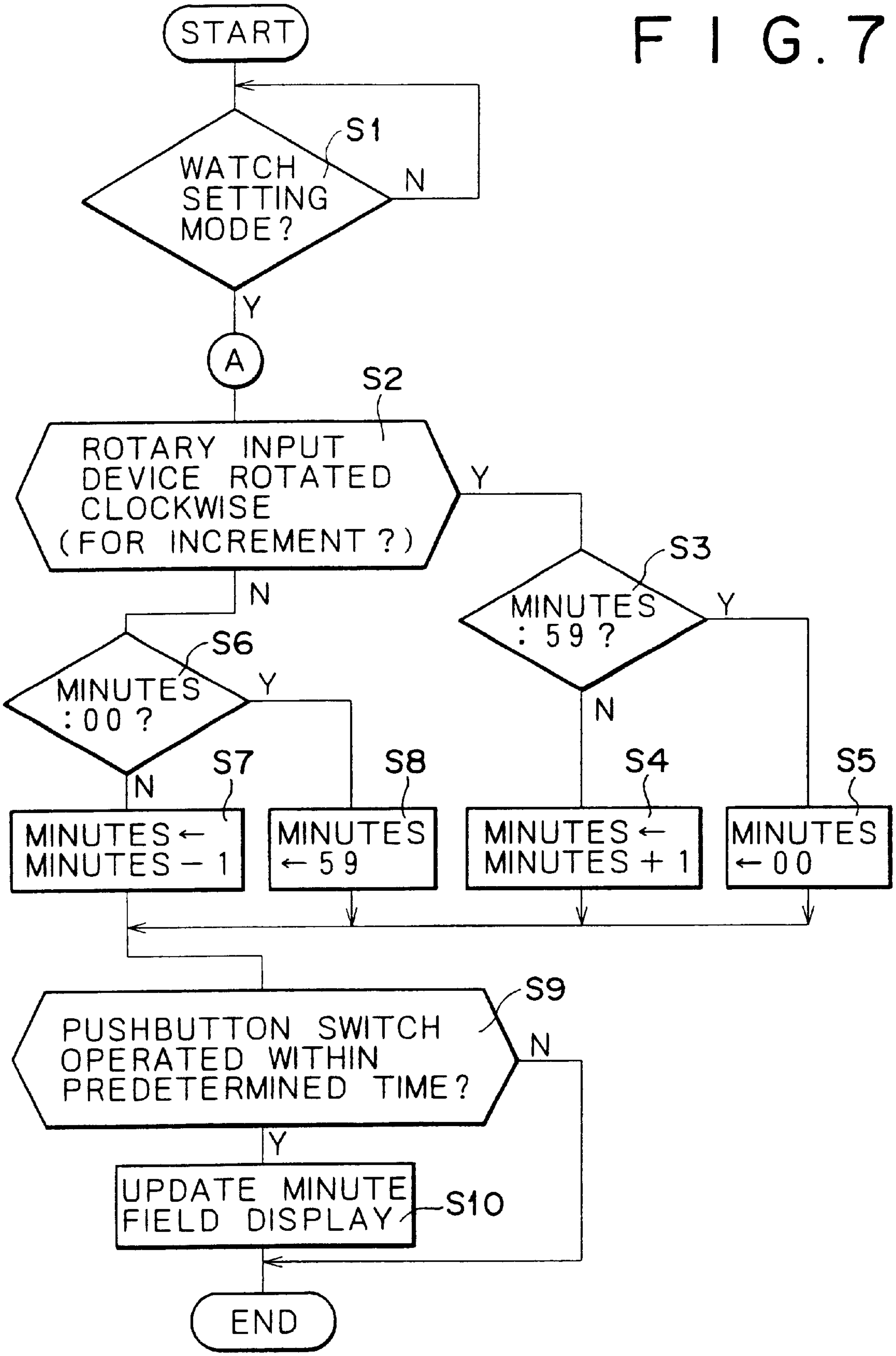
FIG. 7 is a flowchart of steps in which numerics displayed on the first embodiment are changed.

FIG. 7 is a flowchart of steps in which numerics displayed on the first embodiment are changed. Described below with reference to FIG. 7 as well as FIG. 1 is how the minute indication is illustratively changed.

The CPU 5 first performs a procedure in the system memory 22 to verify whether the watch setting mode is in effect (step S1) or not. If the watching setting mode is currently in effect, a date and time-of-day display should be seen on the LCD panel 12 as shown in FIG. 4.

Suppose that the watch setting mode is judged to be in effect and that the minute field is selected by the user's operation. In this case, The CPU 5 executes the display controlling means 28 in the ROM 6 causing the numeric in the minute field to blink.

The CPU 5 now waits for an interrupt by an input signal 9*a* from the rotary input device 9. At the time of an interrupt by the input signal 9*a*, the CPU 5 executes the means 26 in the ROM 6 for determining the rotating direction of the rotary input device. When carried out, the determining means 26 judges the rotating direction of the dial on the rotary input device 9 (step S2).

If the dial is judged to be turned clockwise (for increment) in desired amounts and at desired angle, the CPU 5 executes the displayed numeric incrementing/decrementing means 27 in the ROM 6. The means 27 when executed verifies whether the blinking numeric in the minute field is 59 (step S3).

If the currently blinking numeric in the minute field is judged to be 59 in step S3, the displayed numeric incrementing/decrementing means 27 sets the value to 00 in the minute field (step S5). The value 00 starts blinking. On the other hand, if the blinking numeric in the minute field is judged to be other than 59, the display numeric incrementing/decrementing means 27 increments the displayed value by 1 (step S4). The incremented value then starts blinking.

If the dial is judged to be turned counterclockwise (for decrement) in desired amounts and at desired angles in step S2, the displayed numeric incrementing/decrementing means 27 checks to see if the currently blinking numeric in the minute display is 00 (step S6).

If the blinking numeric in the minute field is found to be 00 in step S6, the displayed numeric incrementing/decrementing means 27 sets the field value to 59 (step S8).

The displayed value 59 starts blinking. On the other hand, if the currently blinking numeric in the minute field is judged to be other than 00, the displayed numeric incrementing/decrementing means 27 decrements the numeric in the minute field by 1 (step S7). The decremented value then starts blinking.

Any one of steps S4, S5, S7 and S8 is followed by the step S9. In the step S9, the CPU 5 checks to see if an input signal has arrived from the pushbutton switch 8 within a predetermined period of time. On ascertaining that a desired value has been reached, the user pushes the pushbutton switch 8 causing the switch to generate the input signal 8*a*.

If generation of the input signal 8*a* is verified in step S9, the display controlling means 28 puts the blinking value in a steadily illuminated state to finally determine the numeric as a definite indication of the minutes. The minute field now indicates the updated and established numeric in the constantly illuminated state (step S10).

If the user judges that the desired value has not been reached yet and the user does not operate the pushbutton switch 8, the process will then terminate at the end of the predetermined period of time without changes in the displayed numeric.

As described, the dial of the rotary input device 9 serves to increment displayed numerics on the LCD panel 12 when turned clockwise and to decrement the numerics when turned counterclockwise, in desired amounts and at desired angles. This allows the user to change the numeric display efficiently in the same manner as with the rheostats of other household electronic devices.

With the first embodiment, only the rotary input device 9 and pushbutton switch 8 need to be operated to make inputs. The fewer the parts used, the smaller the size of the inventive apparatus that may be implemented.

Figure 8:
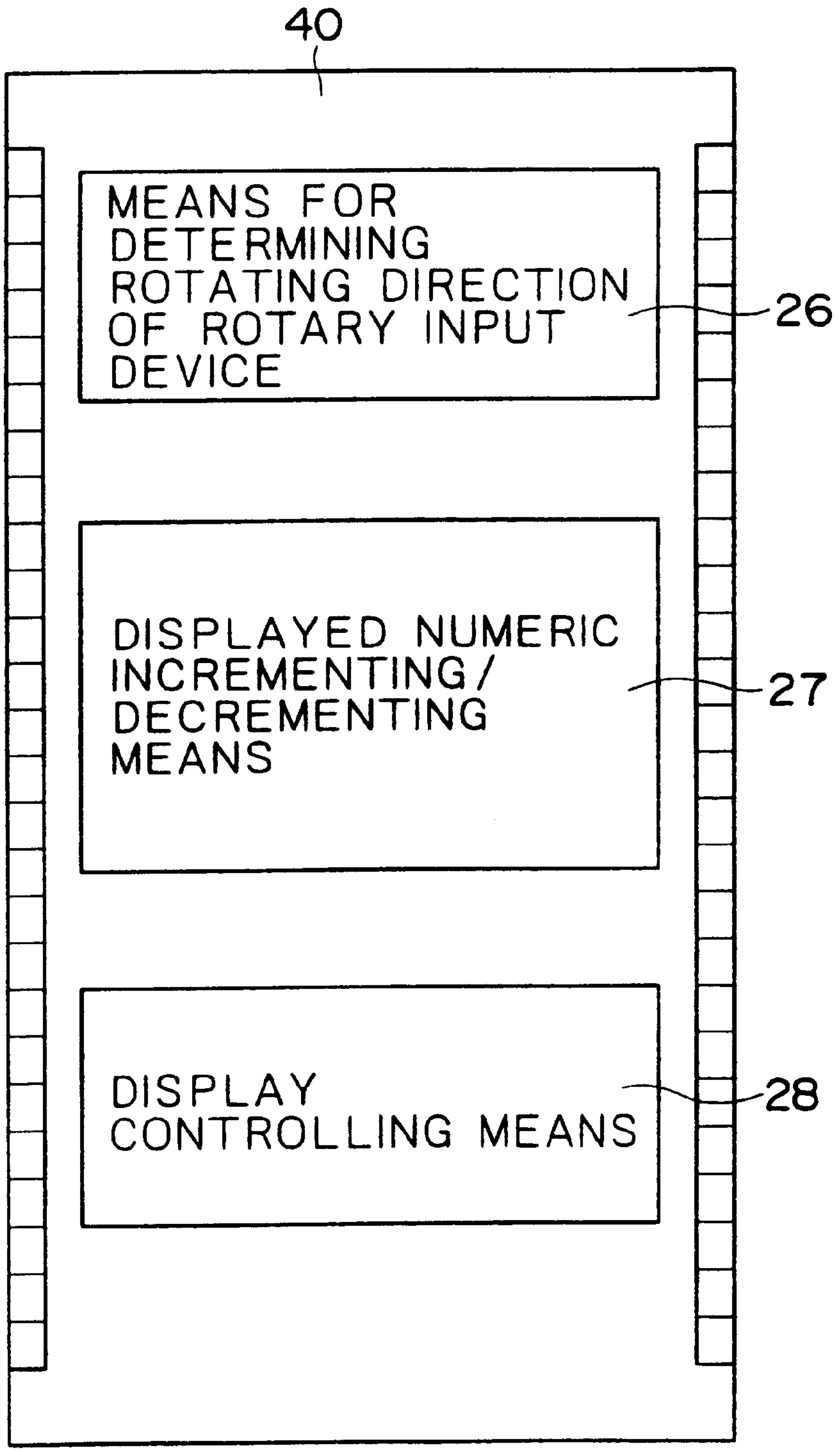
FIG. 8 is an explanatory view of a storage medium practiced as a second embodiment of this invention.

FIG. 8 is an explanatory view of a storage medium 40 practiced as the second embodiment of this invention. The second embodiment will now be described with reference to FIG. 8. The storage medium 40 is a one-chip semiconductor memory. It contains at least three procedures in the form of programs to be read and executed by a computer.

The first procedure held in the storage medium 40 is the means 26 for determining the rotating direction of the rotary input device. This procedure is read by the CPU of the computer and executed thereby to determine in which direction the rotary input device is rotated.

The second procedure is the displayed numeric incrementing/decrementing means 27. This procedure is also read by the CPU of the computer and executed thereby to increment or decrement a numeric(s) on the display screen depending on the rotating direction of the rotary input device as determined by the first procedure.

The third procedure is the display controlling means 28. The procedure is read by the CPU of the computer and executed thereby to control the display operation of those numerics on the display screen which are obtained at least by execution of the second procedure.

Inside a portable information terminal apparatus having a CPU and a rotary input device, the above-described storage medium 40 is incorporated as a memory that accommodates the operating procedures of the CPU. This arrangement implements the capability of the apparatus to increment or decrement the displayed numerics depending on the rotating direction of the input device.

The storage medium 40 as the second embodiment of this invention may be practiced in any of such applications as the flash memory, read-only MOS memory, SRAM, EPROM, EEPROM, and all other nonvolatile semiconductor storage media. The second embodiment may also be applied to an optical memory, an optical magnetic memory, and a magnetic memory.

Figure 9:
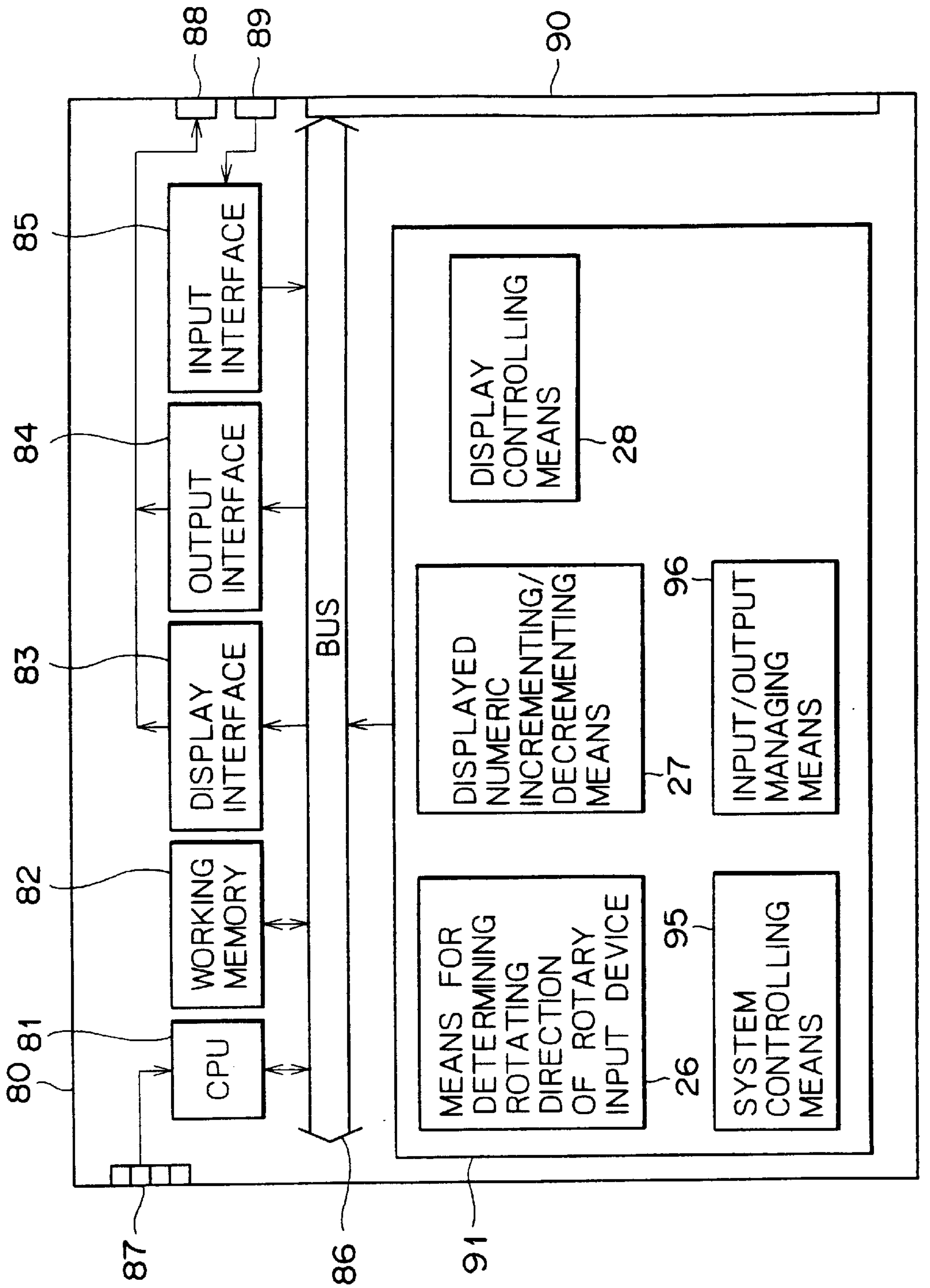
FIG. 9 is a block diagram of a microcomputer practiced as a third embodiment of this invention.

FIG. 9 is a block diagram of a microcomputer 80 practiced as the third embodiment of this invention. The third embodiment in the form of a microcomputer will now be described with reference to FIG. 9.

The microcomputer 80 constitutes a one-chip microcomputer incorporating an internal bus 86. The computer 80 also includes a CPU 81, a working memory 82, a display interface 83, an output interface 84, an input interface 85 and a memory part 91, all connected to the internal bus 86.

The one-chip microcomputer has such external terminals as an interrupt input terminal 87 connected to an interrupt input of the CPU 81; an output terminal 88 connected to the display interface 83 and output interface 84; an input terminal 89 connected to the input interface 85; and a common bus terminal 90 connected to the internal bus 86.

The memory part 91 stores programs that may be executed by the CPU 81. These programs are composed of system controlling means 95, input/output managing means 96, the means 26 for determining the rotating direction of the rotary input device, the displayed numeric incrementing/decrementing means 27, and the display controlling means 28.

The system controlling means 95 controls not only the operations within the one-chip microcomputer 80 but also those of a part or a whole system that incorporates the microcomputer. As such, the system controlling means 95 is adapted to each particular system that utilizes the microcomputer 80.

Likewise, the input/output managing means 96 performs management of data and signals exchanged between the one-chip microcomputer 80 and the outside. The managing means 96 also manages the exchanges of data and signals between the system or its part incorporating the microcomputer 80 and the outside. As such, the input/output managing means 96 is adapted to each particular system that utilizes the microcomputer 80.

The means 26 for determining the rotating direction of the rotary input device is capable of judging the direction in which the rotary input device is rotated when the rotating operation is detected through the input terminal 89. The displayed numeric incrementing/decrementing means 27 is used to increment or decrement a desired numeric(s) displayed on the display screen depending on the rotating direction determined by execution of the rotating direction determining means 26.

The display controlling means 28 serves to control the display operation of numerics obtained by execution of the displayed numeric incrementing/decrementing means 27. Under control of the display controlling means 28, the numerics are output via the output terminal 88 or common bus terminal 90 for display onto an external display screen.

The microcomputer 80 of the above constitution is incorporated into a portable information terminal apparatus that includes a communication facility, a received message memory, a rotary input device for input operations, a display screen for display of messages and other data, a power supply circuit and so on. Housed in such an apparatus, the microcomputer 80 is readily given the function for incrementing or decrementing displayed numerics depending on the rotating direction of the rotary input device.

Figure 10:
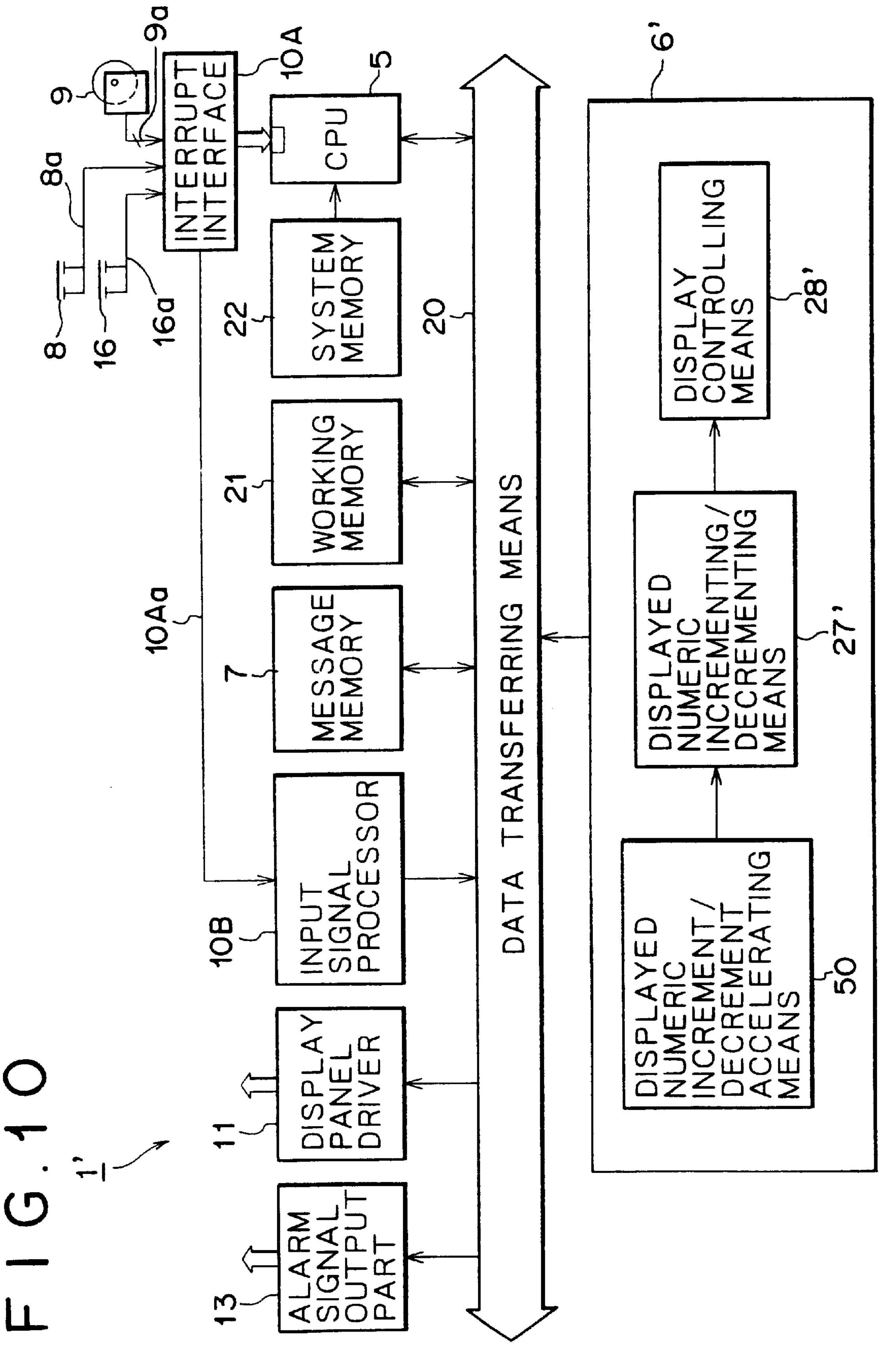
FIG. 10 is a block diagram showing a partial constitution of a pager, i.e., a portable information terminal apparatus practiced as a fourth embodiment of this invention.

FIG. 10 is a block diagram showing a partial constitution of a portable information terminal apparatus 1' which is actually a pager practiced as the fourth embodiment of this invention. The fourth embodiment will now be described with reference to FIG. 10.

Data transferring means 20 of the portable information terminal apparatus 1' is a data bus connected to a CPU 5, a ROM 6', a working memory 21, a message memory 7 (nonvolatile memory), an input signal processor 10B, a display panel driver 11, and an alarm signal output part 13. The CPU 5 exchanges data, via the data transferring means 20, with the ROM 6', working memory 21, message memory 7, display panel driver 11, alarm signal output part 13, and input signal processor 10B.

The CPU 5 is also connected to a system memory 22. This is a memory that contains, in the form of programs executable by the CPU 5, control procedures for controlling the terminal apparatus as a whole.

The CPU 5 has an interrupt receiving terminal that receives an interrupt signal. Input signals 9*a*, 8*a* and 16*a* are generated respectively by operating the rotary input device 9, the pushbutton switch 8, and an input switch 16. Input signals 9*a*, 8*a*, and 16*a* are received by the receiving terminal in the CPU 5 as interrupt signals through the interrupt interface 10A. This brings the CPU 5 into an interrupt handling phase.

In the interrupt handling phase, the input device that has generated the interrupt, i.e., the device operated by the user is first identified. An input value from the input device is then established.

The rotary input device 9 and pushbutton switch 8 are integrally formed. The rotary input device 9 has a rotatable dial that may be turned clockwise or counterclockwise in desired amounts and at desired angles for input. Rotating the dial generates the signal 9*a*. The pushbutton switch 8 is turned on and off when pushed.

The signal 9*a* generated by the rotary input device 9, carrying information about the rotating direction of the dial, is input to the interrupt interface 10A. Given the signal input, the interrupt interface 10A generates an interrupt signal. At the same time, the interrupt interface 10A prepares a signal 10A*a* carrying information about the rotating direction of the dial, and inputs the signal 10A*a* to the input signal processor 10B.

Upon receipt of the signal 10A*a*, the input signal processor 10B forwards the signal either immediately or after holding it for output onto the data transferring means 20. The information is accepted when displayed numeric incrementing/decrementing means 27' in the ROM 6 is executed.

The information about the rotating direction of the dial is either used repeatedly or only once depending on whether the input signal processor 10B is arranged to hold or not to hold the signal 10A*a*. Furthermore, it is possible to make an arrangement to accept data representing the amount and speed of dial rotation on the rotary input device 9.

The information about the ON/OFF state of the pushbutton switch 8 or the input switch 16 is inputted likewise to the interrupt interface 10A. The rotary input device 9 and pushbutton switch 8 are structured so that each of them may be operated separately. That is, the two components may also be operated at the same time to effect simultaneous inputs.

Various means stored in the ROM 6' will now be described. As shown in FIG. 10, the ROM 6' comprises displayed numeric increment/decrement accelerating means 50, displayed numeric incrementing/decrementing means 27', and display controlling means 28', all stored as programs executable by the CPU 5. The form of the programs may be executed either directly or indirectly. The programs prefer to be addressed in an absolute binary format. Alternatively, the programs may be written in a relocatable binary format that requires readdressing upon execution. In the latter case, however, it is necessary to make linkage means reside illustratively in the system memory 22.

The displayed numeric increment/decrement accelerating means 50 starts functioning when executed by the CPU 5. When the rotary input device 9 and input switch 16 are operated simultaneously, the accelerating means 50 acts to increment or decrement a displayed numeric by a predetermined enhanced amount of increment or decrement. That is, the means 50 accelerates the increment or decrement of the numeric on display.

More specifically, an amount $\alpha$ of a single increment or decrement is used as an acceleration factor. When the rotary input device 9 and input switch 16 are not operated simultaneously, an unaccelerated state is recognized and the acceleration factor $\alpha$ is assumed to be 1. In subsequent processing, the displayed number is thus incremented or decremented merely by 1.

If the rotary input device 9 and input switch 16 are operated simultaneously, an accelerated state is recognized and the acceleration factor $\alpha$ is set illustratively to 5. This provides a significantly increased quantity for each increment or decrement. The acceleration factor $\alpha$ may be a default value established upon shipment from the factory.

The displayed numeric incrementing/decrementing means 27' starts functioning when executed by the CPU 5. The means 27' applies the acceleration factor $\alpha$ to the increment or decrement of displayed numerics. The display controlling means 28', also activated by the CPU 5, causes the incremented or decremented numerics to appear on the display screen.

Figure 11:
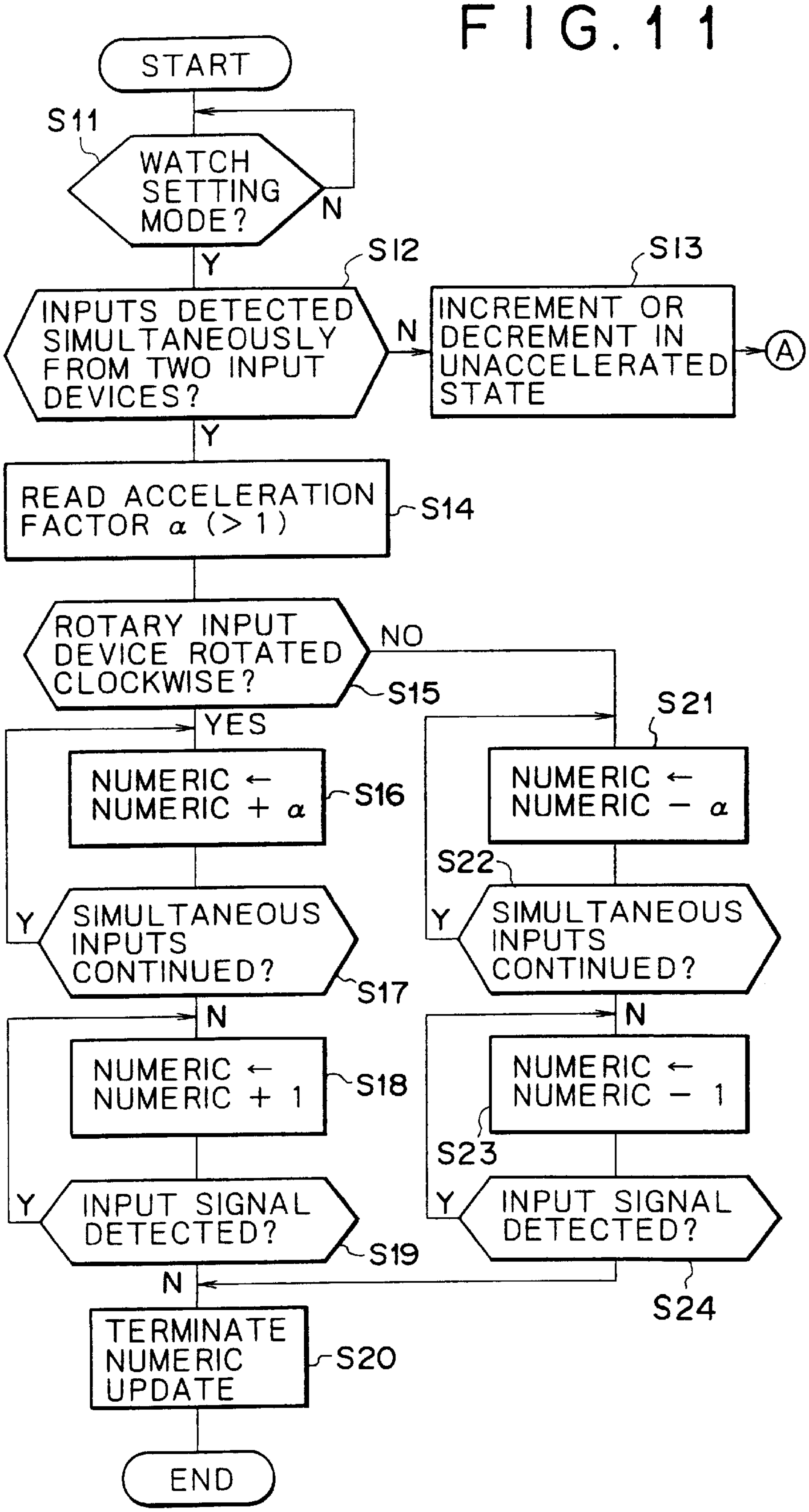
FIG. 11 is a flowchart of steps in which numerics displayed on the fourth embodiment are changed.

FIG. 11 is a flowchart of steps in which numerics displayed on the fourth embodiment are changed on the portable information terminal apparatus practiced as the fourth embodiment of this invention. The CPU 5 first performs a procedure in the system memory 22 to verify whether the watch setting mode is in effect (step S11).

If the watch setting mode is judged to be in effect, the CPU 5 waits for interrupts by an input signal 9*a* from the rotary input device 9 and by an input signal 16*a* from the input switch 16 (step S12). If interrupts by the two signals occur within a predetermined period of time, they are regarded as simultaneous inputs. In that case, the displayed numeric increment/decrement accelerating means 50 in the ROM 6' acts to retrieve the acceleration factor $\alpha$ (>1; step S14). The displayed numeric incrementing/decrementing means 27' held in the ROM 6' is then activated.

On the other hand, if simultaneous inputs are not detected in the step S12, an unaccelerated state is recognized. Thereafter, the processing proceeds in the same manner as that following node A in FIG. 7.

In the step S15, the displayed numeric incrementing/decrementing means 27' judges the rotating direction of the rotary input device 9. If the rotary input device 9 is judged to be rotated clockwise, the currently displayed numeric is incremented by the value a for an accelerated update (step S16).

A check is then made to see if the simultaneous inputs are continued (step S17). If the inputs are found to continue simultaneously, step S16 is reached again and is repeated. If only the input from the rotary input device 9 is detected instead of the simultaneous inputs in step S17, then the accelerated state is replaced by the unaccelerated state in which the current value is incremented merely by 1 for update (step S18).

While the input from the rotary input device 9 is continuing (step S19), step S18 is reached again and is repeated for another increment by 1. With a target value attained, the user stops operating the rotary input device 9. Step S20 is then reached in which the updating of the numeric is terminated.

It may be found in step S15 that the rotary input device 9 is turned counterclockwise. In that case, the currently displayed number is decremented by the value a for an accelerated update (step S21).

A check is then made to see if the simultaneous inputs are continued (step S22). If the inputs are found to continue simultaneously, step S21 is reached again and is repeated. If only the input from the rotary input device 9 is detected instead of the simultaneous inputs in step S22, then the accelerated state is replaced by the unaccelerated state in which the current value is decremented merely by 1 for update (step S23).

While the input from the rotary input device 9 is continuing (step S24), step S23 is reached again and is repeated for another decrement by 1. When the target value is attained, the user stops operating the rotary input device 9 and step S20 is reached. This terminates the updating of the numeric.

Figure 12:
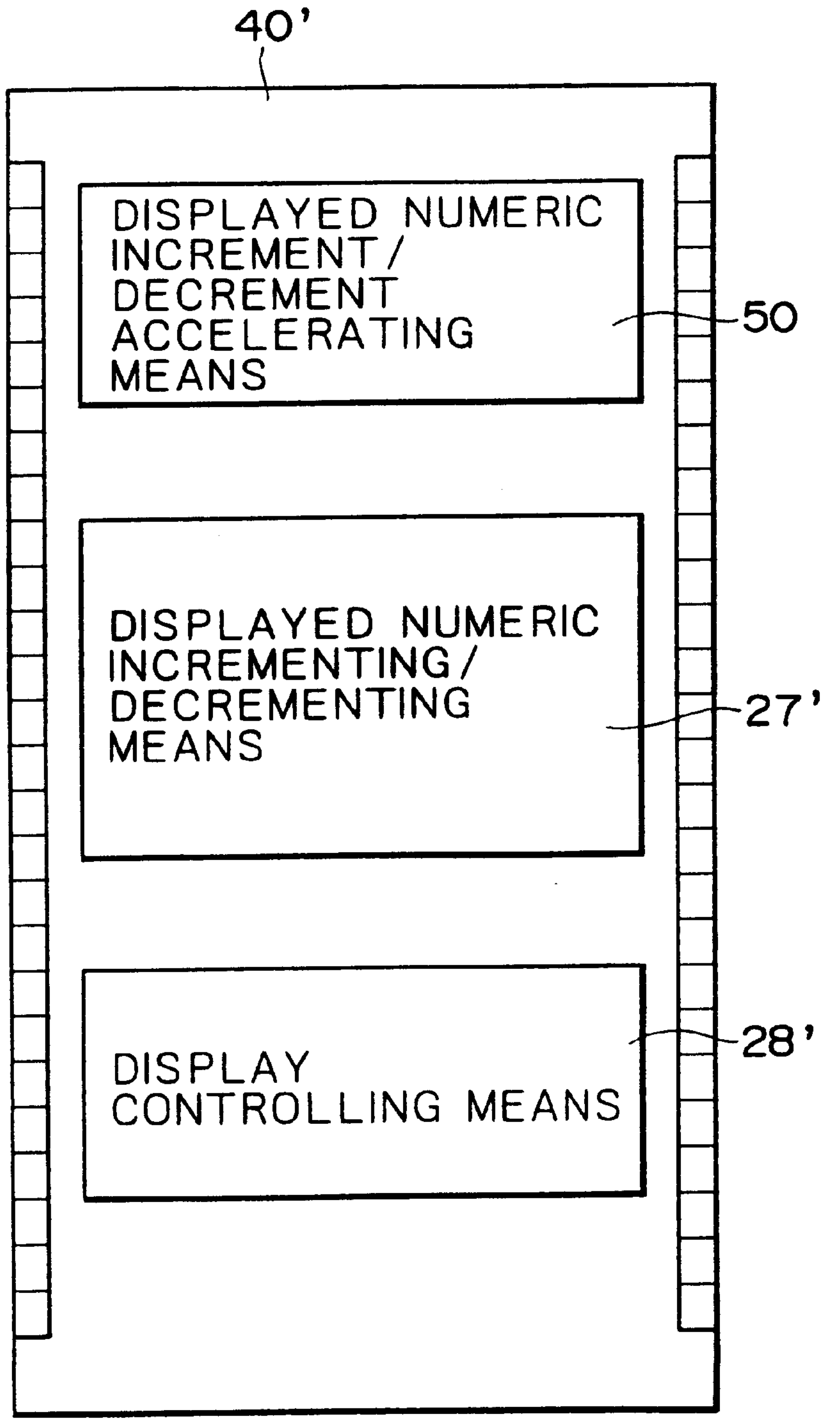
FIG. 12 is an explanatory view of a storage medium practiced as a fifth embodiment of this invention.

FIG. 12 is an explanatory view of a storage medium 40' practiced as the fifth embodiment of this invention. The fifth embodiment will now be described with reference to FIG. 12. The storage medium 40' is a one-chip semiconductor memory. It contains at least three procedures in the form of programs to be read and executed by a central processing unit (CPU) of a computer.

The first procedure held in the storage medium 40' is displayed numeric increment/decrement accelerating means 50. This procedure is read by the CPU of a microcomputer and executed thereby to increment or decrement a displayed numeric by a predetermined enhanced amount of increment or decrement for an accelerated update.

The second procedure is displayed numeric incrementing/decrementing means 27'. This procedure is also read by the CPU of the computer and executed thereby to increment or decrement a numeric(s) on the display screen by the amount of increment or decrement provided by the first procedure.

The third procedure is display controlling means 28'. The procedure is read by the CPU of the computer and executed thereby to control the display operation of those numerics on the display screen which are obtained at least by execution of the second procedure.

Inside a portable information terminal apparatus having a CPU and an input device, the storage medium 40' is incorporated as a memory that accommodates the operating procedures of the CPU. This arrangement implements the functions of the apparatus to increment or decrement the displayed numerics as designated externally by the user and to increment or decrement the numerics by a predetermined enhance amount for an accelerated update.

The storage medium 40' as the fifth embodiment of this invention may be practiced in any of such applications as the flash memory, read-only MOS memory, SRAM, EPROM, EEPROM, and all other nonvolatile semiconductor storage media. The fifth embodiment may also be applied to an optical memory, an optical magnetic memory, and a magnetic memory.

Figure 13:
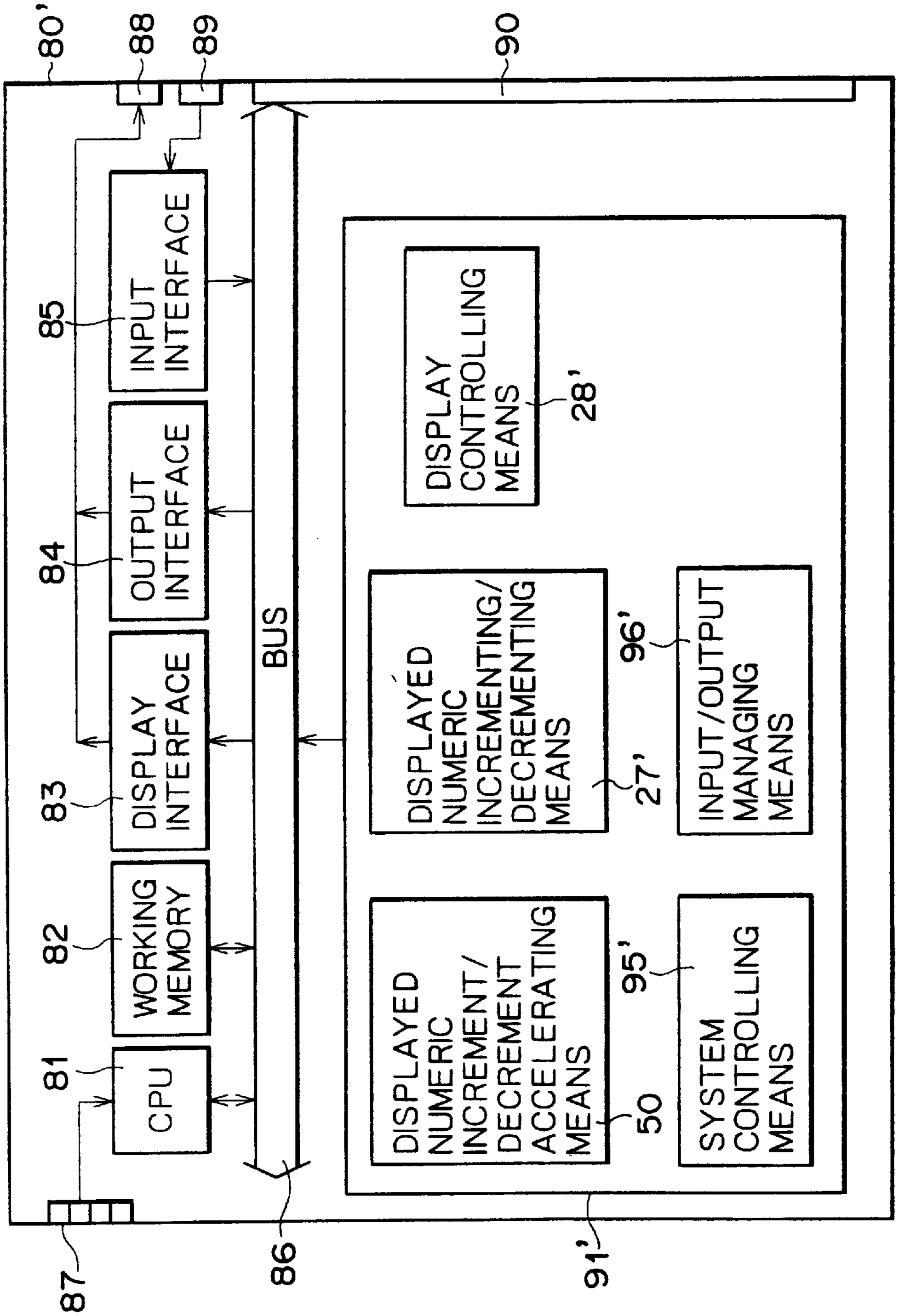
FIG. 13 is a block diagram of a microcomputer practiced as a sixth embodiment of this invention.

FIG. 13 is a block diagram of a microcomputer 80' practiced as the sixth embodiment of this invention. The microcomputer 80' as the sixth embodiment will now be described with reference to FIG. 13.

The microcomputer 80' constitutes a one-chip microcomputer incorporating an internal bus 86. The computer 80' also includes a CPU 81, a working memory 82, a display interface 83, an output interface 84, an input interface 85 and a memory part 91', all connected to the internal bus 86.

The one-chip microcomputer has such external terminals as an interrupt input terminal 87 connected to an interrupt input of the CPU 81; an output terminal 88 connected to the display interface 83 and output interface 84; an input terminal 89 connected to the input interface 85; and a common bus terminal 90 connected to the internal bus 86.

The memory part 91' accommodates program that may be executed by the CPU 81. These programs are composed of system controlling means 95', input/output managing means 96', displayed numeric increment/decrement accelerating means 50, displayed numeric incrementing/decremen ting means 27', and display controlling means 28'.

The system controlling means 95' controls not only the operations within the one-chip microcomputer 80' but also those of a part or a whole system that incorporates the microcomputer. As such, the system controlling means 95' is adapted to each particular system that utilizes the microcomputer 80'.

Likewise, the input/output managing means 96' performs management of data and signals exchanged between the one-chip microcomputer 80' and the outside. The managing means 96' also manages the exchanges of data and signals between the system or its part incorporating the microcomputer 80' and the outside. As such, the input/output managing means 96' is adapted to each particular system that utilizes the microcomputer 80'.

The displayed numeric increment/decrement accelerating means 50 increments or decrements a displayed numeric according to the external inputs by a predetermined enhanced amount of increment or decrement for an accelerated update. The displayed numeric incrementing/decrementing means 27' is used to increment or decrement the numeric(s) on the display screen by that amount of increment or decrement which is provided by the accelerating means 50.

The display controlling means 28' controls the display operation of numerics obtained by execution of the displayed numeric incrementing/decrementing means 27'. Under control of the display controlling means 28', the numerics are output via the output terminal 88 or common bus terminal 90 for display onto an external display screen for display.

The microcomputer 80' of the above constitution is incorporated into a portable information terminal apparatus that includes a communication facility, a received message memory, a rotary input device for input operations, a display screen for display of messages and other data, a power supply circuit and so on. Housed in such an apparatus, the microcomputer 80' is readily able to implement functions to increment or decrement the displayed numerics as designated externally by the user as well as to increment or decrement the numerics by a predetermined enhanced amount for an accelerated update.

The major features and benefits of this invention are summarized as follows:

A portable information terminal apparatus according to a first aspect of the invention comprises a display screen for displaying information and numerics extracted from a received signal, a controlling means for incrementing the displayed numerics when a user rotates the rotatable operation part of a rotary input device clockwise in desired amounts and at desired angles, and a controlling means further decrementing the displayed numerics when the user rotates the rotatable operation part counterclockwise in desired amounts and at desired angles. The user can establish distinct mental association of similarities between the rotating operation of the rotary input device and manipulations of rheostats for adjusting sound volumes of common acoustic devices. The user can operate the terminal apparatus for efficiently incrementing or decrementing numerics displayed thereon with little possibility of confusions or errors.

In a preferred structure of the above portable information terminal apparatus, the displayed numerics on the screen show at least either a date or a time of day. By operating the rotary input device in the same manner as with sound volume rheostats, the user may efficiently change the date or time-of-day indication with little possibility of confusions or errors.

A numeric displaying method according to a second aspect of the invention is for use with an information terminal apparatus including a display screen for displaying numerics and a rotary input device with a rotatable operation part. The method causes the displayed numerics to be incremented when the rotatable operation part is rotated clockwise and decremented when the operation part is rotated counterclockwise, in desired amounts and at desired angles. The user may change the numeric display reliably and efficiently in the same manner as with sound volume rheostats of common acoustic devices.

Preferably, with the preceding numeric displaying method in effect, the displayed numerics on the display screen show at least either a date or a time of day. These numerics may be changed efficiently in the same manner as with manipulations of the sound volume rheostats.

A storage medium according to a third aspect of the invention accommodates at least three procedures: a procedure for determining direction in which a rotary input device is rotated for input; a procedure for incrementing or decrementing numerics displayed on a display screen depending on the rotating direction determined; and a procedure for controlling the display operation of the numerics on the display screen. The three procedures are stored in the form of programs that may be read and executed by a computer.

The above storage medium together with its stored operating procedures is incorporated as a memory into a portable information terminal apparatus comprising a central processing unit and a rotary input device. Equipped with that memory, the terminal apparatus readily provides a function to increment or decrement displayed numerics depending on the rotating direction of the rotary input device.

In a preferred structure of the above storage medium, the displayed numerics show at least either a date or a time of day. When this preferred storage medium together with its stored procedures is incorporated as a memory into a portable information terminal apparatus comprising a central processing unit and a rotary input device, the terminal apparatus readily provides a function to increment or decrement the displayed date or time of day depending on the rotating direction of the rotary input device.

A microcomputer according to a fourth aspect of the invention comprises a storage part for storing procedures which may be read and executed by a central processing unit in the form of programs. The programs include a procedure for determining in which direction a rotary input device is rotated for input; a procedure for incrementing or decrementing numerics displayed on a display screen depending on the rotating direction determined; and a procedure for controlling the display operation of the numerics on the display screen.

The above microcomputer may be supplemented with a communication facility, a received message memory, a rotary input device, a display screen and so on. As such, the microcomputer may constitute a simply structured portable information terminal apparatus capable of incrementing or decrementing the displayed numerics on the screen depending on the rotating direction detected.

In a preferred structure of the preceding microcomputer, the displayed numerics may constitute at least a date or a time of day. When this preferred microcomputer is supplemented with a communication facility, a received message memory, a rotary input device a display screen and so on, the microcomputer may constitute a simply structured portable information terminal apparatus capable of incrementing or decrementing the displayed date or time of day on the screen depending on the rotating direction detected.

A portable information terminal apparatus according to a fifth aspect of the invention comprises first inputting means for inputting an increment or decrement reflecting revolutions of a rotary input device, and second inputting means for effecting input operations including activation (ON) and deactivation (OFF) of inputs. On a display screen, the displayed numerics are incremented or decremented in units of a predetermined amount every time an input is made through the first inputting means. The predetermined unit amount is incremented in keeping with the input from the second inputting means.

With the above terminal apparatus, the user operates the second inputting means to boost the unit amount for increment or decrement while simultaneously rotating the first inputting means. This makes it possible to update the displayed numerics by an enhanced amount for every input operation, whereby the time required to reach a target value is shortened and the updating operations are simplified.

In a preferred structure of the preceding portable information terminal apparatus, the numerics displayed on the display screen show at least either a date or a time of day. Thus when the user operates the second inputting means to boost the unit amount for increment or decrement while simultaneously rotating the first inputting means, the displayed date or time of day may be updated by an enhanced amount for every input operation. This means that the time required to reach a target value is shortened and that the updating operations are simplified.

A numeric displaying method according to a sixth aspect of the invention is for use with a portable information terminal apparatus comprising a display screen and a rotary input device with a rotatable operation part that may be operated by the user. The method comprises the steps of either incrementing or decrementing the displayed numerics on the display screen in units of a predetermined amount every time the operation part is rotated; and incrementing the predetermined unit amount for increment or decrement in keeping with an input operation performed on a second input device.

The above inventive method allows the user to operate the second input device while simultaneously rotating the rotary input device, thereby updating the displayed numerics by an enhanced amount for every input operation. This makes it possible to shorten the time required to reach a target value and to simplify the updating operations.

Preferably, with the above numeric displaying method in effect, the numerics to be incremented or decremented show at least either a date or a time of day. Thus when the user operates the second input device while simultaneously rotating the rotary input device, the displayed date or time of day may be updated by an enhanced amount for every input operation. This makes it possible to shorten the time required to reach the target date or time of day and to simplify the updating operations.

A storage medium according to a seventh aspect of the invention comprises at least three procedures: a procedure for incrementing or decrementing, in units of a predetermined amount, numerics displayed on the display screen; a procedure for increasing the predetermined unit amount for increment or decrement; and a procedure for controlling display operations of the numerics on the display screen. The three procedures are stored in the form of programs that may be read and executed by a computer.

Consequently, the above storage medium together with its stored operating procedures is incorporated as a memory into a portable information terminal apparatus comprising a central processing unit and a rotary input device. Equipped with that memory, the terminal apparatus readily provides functions to increment or decrement displayed numerics by a predetermined unit amount and to increase the predetermined unit amount of increment or decrement.

In a preferred structure of the preceding storage medium, the displayed numerics show at least either a date or a time of day. When this preferred storage medium together with its stored procedures is incorporated as a memory into a portable information terminal apparatus comprising a central processing unit and a rotary input device, the terminal apparatus readily provides functions to increment or decrement the displayed date or time of day as designated by an external input and to increase the predetermined unit amount as per input, by which to increment or decrement the date or time of day.

A microcomputer according to an eighth aspect of the invention has a storage part comprising a procedure for incrementing or decrementing, in units of a predetermined amount, numerics to be displayed on a display screen; a procedure for increasing the predetermined unit amount for increment or decrement; and a procedure for controlling display operations of the numerics on the display screen.

The microcomputer above may be supplemented with a communication facility, a received message memory, a rotary input device, a display screen and so on. Thus, the microcomputer may constitute a simply structured portable information terminal apparatus capable of incrementing or decrementing the displayed numerics by a predetermined unit amount and of increasing the predetermined unit amount of increment or decrement.

In a preferred structure of the preceding microcomputer, the displayed numerics show at least either a date or a time of day. When this preferred microcomputer is supplemented with a communication facility, a received message memory, a rotary input device, a display screen and so on, the microcomputer may constitute a simply structured portable information terminal apparatus with functions to increment or decrement the displayed date or time of day as designated by an external input and to increase the predetermined unit amount as per the input, by which to increment or decrement the date or time of day.

What is claimed is:

1. An information terminal apparatus comprises:

communicating means for communication by radio;

controlling means for executing at least data processing;

a display screen, wherein when said communicating means receives a radio wave signal from a transmitting base, said controlling means thereupon extracts information from the received signal and displays the extracted information on said display screen; and an input device having first, second, and third input means, wherein said first input means includes a rotary operation part adapted to be rotated clockwise and counterclockwise in desired amounts and at desired angles to effect incrementing or decrementing inputs, said second input means permits input operations including activation and deactivation of the inputs, said first and second input means are integrally formed as a jog-dial, wherein said controlling means displays predetermined numerics on said display screen, processes the inputs from said input device, and changes said predetermined numerics displayed on said display screen in accordance with the processed inputs, said controlling means performs one of incrementing and decrementing the displayed numerics by one every time an input is made through said first input means of said jog-dial, and when said third input means is activated simultaneously with said first input means, said controlling means performs one of incrementing and decrementing the displayed numerics by an acceleration factor of more than one every time said input is made through said first input means of said jog-dial.

2. The information terminal apparatus according to claim 1, wherein said predetermined numerics displayed on said display screen show one of a date and a time of day.

3. A numeric displaying method for use with an information terminal apparatus including controlling means for executing data processing, a display screen, and an input device including first, second, and third input means, wherein said first input means includes a rotatable operation part, said second input means permits input operations including activation and deactivation of the inputs, said first and second input means are integrally formed as a jog-dial, said controlling means displaying predetermined numerics on said display screen and causing said predetermined numerics to be incremented and decremented in accordance with manipulations of said rotatable operation part, said numeric displaying method comprising the step of:

performing one of incrementing and decrementing the displayed numerics by one every time an input is made through said first input means of said jog-dial; and when said third input means is activated simultaneously with said first input means performing one of incrementing and decrementing the displayed numerics by an acceleration factor of more than one every time said input is made through said first input means of said jog-dial.

4. The numeric displaying method for use with an information terminal apparatus according to claim 3, comprising the further step of displaying said predetermined numerics on said display screen to show one of a date and a time of day.

5. An information processing apparatus comprising:

a central processing unit;

an input device including first, second, and third input means, wherein said first input means includes a rotary input device, said second input means permits input operations including activation and deactivation of the inputs, and said first and second input means are integrally formed as a jog-dial;

a storage part for storing steps which may be read and executed by said central processing unit in the form of programs; and a data transfer part connected to said central processing unit and to said storage part and arranged for connection to an external device, whereby signals representing results of processing by said central processing unit are transferred to said external device by one of a wired fashion and by radio, wherein said storage part stores a program to be read out and executed by said central processing unit, said program including the steps of:

determining a direction in which the rotary input device is rotated when providing a user input;

performing either incrementing or decrementing of predetermined numerics displayed on a display screen in accordance with the direction of rotation of the rotary input device determined in the step of determining;

controlling display operations of the numerics on said display screen;

performing one of incrementing and decrementing the displayed numerics by one every time an input is made through said first input means of said jog-dial; and when said third input means is activated simultaneously with said first input means performing one of incrementing and decrementing the displayed numerics by an acceleration factor of more than one every time said input is made through said first input means of said jog-dial.

6. The information processing apparatus according to claim 5, wherein said predetermined numerics show one of a date and a time of day.

7. A portable information terminal apparatus comprising:

communicating means for communication by radio;

controlling means for executing data processing; and a display screen, wherein said communicating means receives a radio wave signal from a transmitting base, said controlling means thereupon extracts information from the received signal and displays the extracted information on said display screen; and first, second, and third input means for permitting user inputs to establish operating conditions, wherein said first input means has a rotatable operation part adapted to be rotated clockwise and counterclockwise in desired amounts and at desired angles to effect either incrementing or decrementing inputs, said second input means permits input operations including activation (ON) and deactivation (OFF) of the inputs, said first and second input means are integrally formed as a jog-dial, said controlling means displays predetermined numerics on said display screen, said controlling means performs one of incrementing and decrementing the displayed numerics by one every time an input is made through said first input means of said jog-dial, and when said third input means is activated simultaneously with said first input means, said controlling means performs one of incrementing and decrementing the displayed numerics by an accelerating factor of more than one every time said input is made through said first input means of said jog-dial.

8. The portable information terminal apparatus according to claim 7, wherein said predetermined numerics displayed on said display screen show one of a date and a time of day.

9. A numeric displaying method for use with a portable information terminal apparatus having a display screen for displaying information including numerics, first, second, and third input means for permitting user inputs to establish operating conditions, wherein said first input means includes a rotary operation part adapted to be rotated by a user clockwise and counterclockwise in desired amounts and at desired angles either to increment or to decrement the displayed numerics the method including the steps of:

performing one of incrementing and decrementing the displayed numerics on said display screen by one every time an input is made through said rotary input device; and when said third input means is activated simultaneously with said first input means, said controlling means performs one of incrementing and decrementing the displayed numerics by an acceleration factor of more than one every time said input is made through said first input means.

10. The numeric displaying method for use with a portable information terminal apparatus according to claim 9, comprising the further step of displaying the numerics to be either incremented or decremented to show one of a date and a time of day.

11. A microcomputer comprising:

a central processing unit;

an input device including first, second, and third input means, wherein said first input means includes a rotary input device, said second input means permits input operations including activation and deactivation of the inputs, and said first and second input means are integrally formed as a jog-dial;

a storage part for storing steps which may be read and executed by said central processing unit in the form of programs; and a data transfer part connected to said central processing unit and to said storage part and and arranged for connection to an external device, whereby signals representing results of processing by said central processing unit are transferred to said external device in one of a wired fashion and by radio, wherein said storage part stores a program read and executed by said central processing unit, said program at least comprising the steps of:

performing one of incrementing or decrementing numerics to be displayed on a display screen in response to a direction of rotation of said rotary input device;

controlling display operations of said numerics on said display screen;

performing one of incrementing and decrementing the displayed numerics by one every time an input is made through said first input means of said jog-dial; and when said third input means is activated simultaneously with said first input means performing one of incrementing and decrementing the displayed numerics by an acceleration factor of more than one every time said input is made through said first input means of said jog-dial.

12. The microcomputer according to claim 11, wherein said numerics show one of a date and a time of day.

* * * * *